United States Patent [19]

Maki et al.

[11] 4,393,429
[45] Jul. 12, 1983

[54] SUPERCONDUCTIVE COIL SYSTEM WITH PROTECTING DEVICE

[75] Inventors: Naoki Maki, Tokai; Seiji Numata; Kiyoshi Yamaguchi, both of Ibaraki; Heroe Yamamoto, Tokai, all of Japan

[73] Assignee: Hitachi, Ltd., Tokyo, Japan

[21] Appl. No.: 257,375

[22] Filed: Apr. 24, 1981

[30] Foreign Application Priority Data

Apr. 24, 1980 [JP] Japan ................... 55/53618

[51] Int. Cl.$^3$ ............................................. H03K 3/38
[52] U.S. Cl. .................................................... 361/19
[58] Field of Search ................. 361/19, 4; 307/245

[56] References Cited

U.S. PATENT DOCUMENTS

| | | | |
|---|---|---|---|
| 3,304,466 | 2/1967 | Minnich et al. | 361/19 |
| 3,305,699 | 2/1967 | Watrous et al. | 361/19 |
| 3,711,744 | 1/1973 | Luton, Jr. | 361/19 |

*Primary Examiner*—Reinhard J. Eisenzopf
*Attorney, Agent, or Firm*—Antonelli, Terry & Wands

[57] ABSTRACT

A superconductive coil has both its terminals connected in parallel with a protecting device which has a diode and a unipolar d.c. motor connected in series with each other. The superconductive coil is further connected with an energizing d.c. power source through a switch. The conductive direction of the diode is so selected that the d.c. motor is driven by the energizing energy of the superconductive coil when the switch is opened in the quenching operation of the superconductive coil.

7 Claims, 8 Drawing Figures

SUPERCONDUCTIVE COIL SYSTEM WITH PROTECTING DEVICE

BACKGROUND OF THE INVENTION

The present invention relates to a superconductive coil system for use in a nuclear fusion plant or a magnetic train floating system, and more particularly to a superconductive coil system which is equipped with a protecting device in a quenching operation.

As a protecting device when in the quenching operation of a superconductive coil system, there has been used a resistor type protecting device which is disclosed in Japanese Patent Laid-Open Publication No. 55-27410 laid open in 1980. In the system thus disclosed, the superconductive coil is energized by a d.c. motor through a current switch when in a normal running operation. In the quenching operation, on the contrary, the current switch is turned off so that a portion of the magnetic energy owned by the superconductive coil is consumed as the Joule heat of a protecting resistor which is connected in parallel with the superconductive coil. As a result, the heat generation in terms of the Joule heat of the superconductive coil is reduced.

Both the current to flow through the superconductive coil after the current switch is turned off and the terminal voltage e are expressed by the following Equation:

$$L(di/dt) + Ri = 0$$

hence, $$i = I_0 e^{-(R/L)t} \quad (1)$$

hence, $$e = E_m e^{-(R/L)t} \quad (2)$$

wherein:
$E_m = I_0 R_c$: Maximum coil terminal voltage;
$R = R_c + R_s$;
$L = L_s$;
$L_s$: Inductance of the superconductive coil;
$R_s$: Resistance after the quenching operation of the superconductive coil;
$R_c$: Resistance of the protecting resistor;
$I_0$: Energizing Current in the normal operation;
$t$: Time.

The ratio $P_r$ of the energy to be consumed by the superconductive coil to the magnetic energy of the superconductive coil is expressed by the following Equation if the resistance $R_s$ of the superconductive coil after the quenching operation is assumed to be constant:

$$P_r = \frac{\int_0^\infty R_s i^2 dt}{\frac{1}{2} \cdot L_s I_0^2} = \frac{\frac{R_s}{2R} L_s I_0^2}{\frac{1}{2} \cdot L_s I_0^2} = \frac{R_s}{R_c + R_s} \quad (3)$$

Since the maximum coil terminal voltage $E_m$ is restricted by the insulating characteristics (or the withstand voltage performance) of the superconductive coil, the resistance of the protecting resistor has to be expressed by the relationship of $R_c \leq E_m/I_0$.

On the other hand, the heat to be generated by the superconductive coil is reduced the more, in view of the Equation (3), as the resistance $R_c$ of the protecting resistor becomes the more than the resistance $R_s$ of the superconductive coil when in the quenching operation. Therefore, the resistance of the protecting resistor is preset as high as possible within the limit of the withstand voltage performance of the superconductive coil.

However, since the allowable withstand voltage of the superconductive coil is generally low, e.g., 1 to 2 KV at the highest, there arises a defect that the heat generation percentage of the superconductive coil becomes high and reaches 20 to 30% or more.

Moreover, since the Joule heat loss takes only at the superconductive coil for the time period from the instant when it is detected in terms of the detection of the terminal voltage or the density of magnetic flux that the superconductive coil is quenched to the instant when the current switch is turned off, i.e., for 0.1 to 0.3 seconds, there arises another defect that the self-generation of the heat is increased.

SUMMARY OF THE INVENTION

It is, therefore, an object of the present invention to provide a superconductive coil which has its heat generation reduced when in the quenching operation.

Another object of the present invention is to provide a superconductive coil which has its heat generation reduced when in the quenching operation and which is highly reliable.

According to a feature of the present invention, a d.c. motor is connected between the terminals of a superconductive coil through a unidirectional current gate device so that the magnetic energy of the superconductive coil may be partially converted into the rotational energy of a d.c. motor when in the quenching operation of the superconductive coil.

DESCRIPTION OF THE PREFERRED EMBODIMENTS

Figure 1:
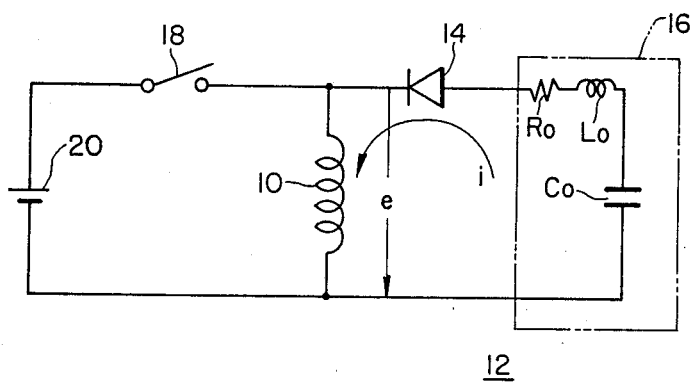
FIG. 1 is an electric circuit diagram showing one embodiment of the present invention.

As shown in FIG. 1, a protecting device 12 is connected between both the terminals of a superconductive coil 10. The protecting device 12 is constructed of a series circuit which is composed of a unidirectional current gate device, e.g., a diode 14 and a d.c. motor 16. The conductive direction of the unidirectional current gate device 14 is so preset that a current i continuously flows through a closed circuit, which is constructed of the superconductive coil 10, the d.c. motor 16 and the unidirectional current gate device 14, when a current switch 18 is turned off in the quenching operation of the superconductive coil 10. That current i will continuously flow until the magnetic energy of the superconductive coil 10 is reduced to zero.

The d.c. motor 16 is equivalently expressed by the series circuit which is composed of a capacitor $C_0$ for storing a voltage corresponding to an induction voltage, an internal inductance $L_0$ and an internal resistor $R_0$.

In the normal running operation, since the current switch 18 is turned on, the superconductive coil 10 is energized by a d.c. power source 20. However, since the conductive direction of the unidirectional current gate device 14 is opposite, no current flows through the d.c. motor 16.

When the superconductive coil 10 is quenched, the current switch 18 is turned off so that the current to flow through the superconductive coil 10 starts to be reduced. According to this, the terminal voltage e is generated by the term of L(di/dt) in the opposite direction to that in the normal running operation so that the current i continuously flows through the d.c. motor by way of the unidirectional current gate device 14. In other words, the path of the current to flow through the superconductive coil 10 is instantly shifted from the d.c. power source to the d.c. motor by turning the current switch 18.

Next, when in the quenching operation of the superconductive coil 10, the current i and the terminal voltage e of the superconductive coil 10 immediately after the current switch 18 is turned on are expressed by the following Equation:

$$1/C \int i\,dt + L(di/dt) + Ri = 0 \qquad (4)$$

wherein:
$C = C_0$: Equivalent Capacitance of the d.c. Motor.
$L = L_s + L_0$: Total inductance of the circuit;
$R = R_s + R_0$: Total resistance of the circuit.

If the relationships of $i = I_0$ and $q = 1/C \int i\,dt = 0$ (Here, the d.c. motor in the normal running operation is stationary, or the field current is zero) are used for the initial condition of $t = 0$, the value i in the Equation (4) is expressed, as follows. (Here, the relationships of $2/R \sqrt{L/C}$ 1 is taken to generate an oscillatory current).

$$i = \frac{I_0}{\beta_1 \sqrt{LC}} e^{-\alpha_1 t} \sin(\theta_1 - \beta_1 t), \qquad (5)$$

where, $\alpha_1 = R\,2L;$ $\beta_1 = \sqrt{\dfrac{1}{LC} - \left(\dfrac{R}{2L}\right)^2}$ ; and $\theta_1 = \tan^{-1}(\beta_1/\alpha_1).$ Hence, the terminal voltage e of the superconductive coil is expressed by the following Equation:

$$e = -L_s(di/dt) = (L_s I_0/\beta_1 LC)e^{-\alpha_1 t}\sin(2\theta_1 - \beta_1 t) \qquad (6)$$

On the other hand, the self-heat generating ratio of the superconductive coil to the magnetic energy of the superconductive coil is expressed by the following Equation:

$$P_r = \frac{\int_0^{t_o} R_s i^2\,dt}{\tfrac{1}{2} L_s I_0^2} \qquad (7)$$

$$= \frac{R_s}{2\beta_1^2 L_s \sqrt{LC}} \left\{ \frac{2}{R} \frac{\sqrt{L}}{C} - \frac{R}{2} \frac{\sqrt{C}}{L} \right\} (1 - e^{-2\alpha_1 t_o})$$

where, $$t_0 = \theta_1/\beta_1 \qquad (8);$$

$t_0$ = Time until the current i becomes zero. If the relationship of $2/R\sqrt{L/C} = k$ ($k > 1$) holds, the current i, the voltage 3, the maximum terminal voltage $E_m$ and the self-heat generating ratio $P_r$ are expressed by the Equations (5) to (7), as follows:

$$i = \frac{k}{\sqrt{k^2 - 1}} I_o \cdot e^{-\frac{R}{2L} t} \sin(\theta_1 - \frac{\sqrt{k^2-1}}{k} \cdot \frac{t}{\sqrt{LC}}) \qquad (9)$$

$$e = \frac{k^2}{2\sqrt{k^2-1}} RI_o \cdot e^{-\frac{R}{2L}t} \sin(2\theta_1 - \frac{k^2-1}{k} \cdot \frac{t}{\sqrt{LC}}) \qquad (10)$$

$$E_m = RI_o \cdot \frac{k}{2} \cdot e^{-(3\theta_1 - \pi)/\sqrt{k^2-1}} \qquad (11)$$

$$P_r = \frac{R_s}{R}(1 - e^{-2\theta_1/\sqrt{k^2-1}}) \qquad (12)$$

where, $$\theta_1 = \tan^{-1}\sqrt{k^2 - 1}. \qquad (13)$$

Figure 2:
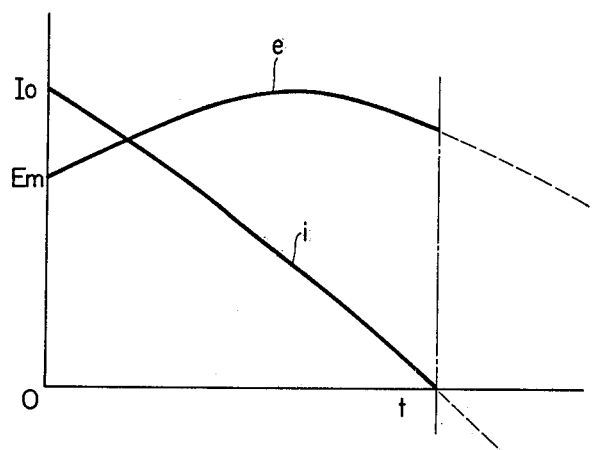
FIG. 2 is a current and voltage waveform chart for explaining the operations of FIG. 1.

The waveforms of the current i and voltage e of the superconductive coil, which are expressed by the Equations (9) and (10), are drawn in FIG. 2. As shown, the current i is decreased generally in the form of a sine wave, whereas the voltage e is increased generally in the form of a sine wave. Now, if it were not for the unidirectional current gate device 14, the current i and the voltage e oscillate positively and negatively. As a result, the magnetic energy of the superconductive coil 10 repeats at most the conversion into the magnetic energy of the d.c. motor and the reconversion into the magnetic energy of that coil so that the magnetic energy of the superconductive coil becomes the heat generated thereby, whereby the function of the protecting device is not performed. By providing the unidirectional current gate device 14, however, the current i does not flow in the negative direction so that most of the magnetic energy of the superconductive coil 10 is converted into the rotational coil of the d.c. motor 16. Since the magnetic energy is stored as the rotational energy, it can be effectively reused for the re-energization of the superconductive coil 10.

Figure 3:
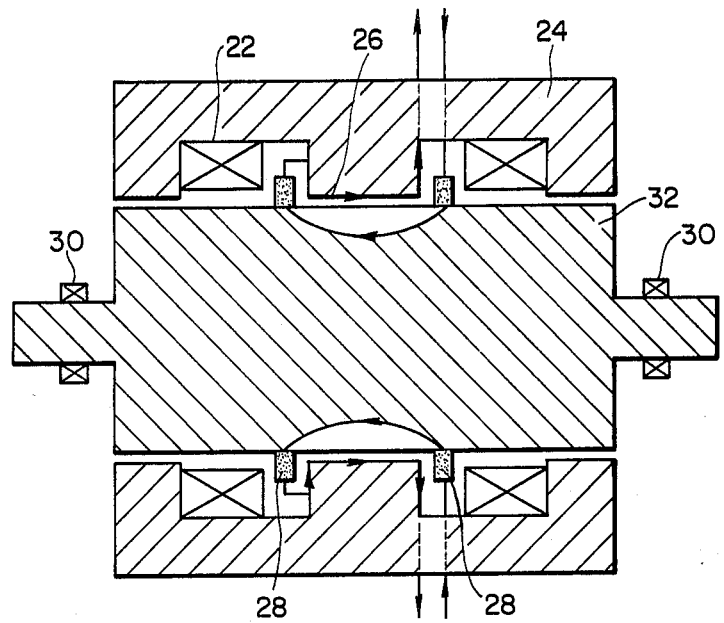
FIG. 3 is a sectional view schematically showing a unipolar motor to be used in FIG. 1.

Although a variety of systems are conceived as the d.c. motor 16, the unipolar motor shown in FIG. 3 is the most proper for use partly because its rotor has such a simple construction that it can rotate at a high speed and partly because the unipolar motor can store a high rotational energy. In FIG. 3, the stator of the unipolar motor is primarily constructed of a field winding 22, a yoke 24, an armature compensating conductor 26, current collectors 28 and bearings 30, whereas the rotor is primarily constructed of a cylindrical conductor 32.

Since the cylindrical conductor is fabricated by joining the conductor of copper, aluminum or the like to the surface of copper or steel, it has no slot so that it has a simple construction suitable for high speed rotations. By providing the compensating conductor 26, morever, the internal inductance $L_0$ can be reduced, and the internal resistance $R_0$ can also be constructionally reduced. The equivalent capacitance $C_0$ of the unipolar motor can be expressed by the following Equation:

$$C_o = \frac{i_o}{\frac{de_o}{dt}} = \frac{e_o i_o}{e_o \frac{de_o}{dt}} = \frac{\frac{d}{dt}\left(\frac{1}{2} J \cdot \left(\frac{v}{r}\right)^2\right)}{Blv \cdot \frac{d}{dt}\{Blv\}} \quad (14)$$

$$= \frac{\frac{1}{2} J \frac{2v}{r^2} \cdot \frac{dv}{dt}}{Blv \cdot Bl \cdot \frac{dv}{dt}} = \frac{J}{B^2 l^2 r^2}$$

where,
- $e_0$ and $i_0$: Induced voltage and current of the unipolar motor;
- $J$: Moment of inertia;
- $v$: Velocity;
- $B$. Density of field magnetic flux; and
- $r$ and $l$: Radius and length of the rotor.

From the Equation (14), the adjustment of the equivalent capacitance value of the unipolar motor can be performed by changing the size of the rotor and the density of the field magnetic flux (ie., the field current).

As the evaluation factor of the protecting device when in the quenching operation of the superconductive coil, it is possible to use the product $P_r E_m$, because it is the better as both the heat generating ratio $P_r$ and the maximum terminal voltage $E_m$ of that coil are the lower. It can be said that the performance of the protecting device is the better as the product $P_r E_m$ is the lower. In the case of the protecting system according to the prior art, from the Equations (1) to (3), the following relationship holds:

$$P_r E_m / R_c I_o = R_s / (R_c + R_s) \quad (15)$$

In the case of the present embodiment, from the Equations (11) and (12), the following relationship holds:

$$\frac{P_r E_m}{R_c I_o} = \frac{k}{2} \cdot \frac{R_s}{R_c} e^{-(3\theta_1 - \pi)/\sqrt{k^2 - 1}} \cdot (1 - e^{-2\theta_1/\sqrt{k^2-1}}) \quad (16)$$

Figure 4:
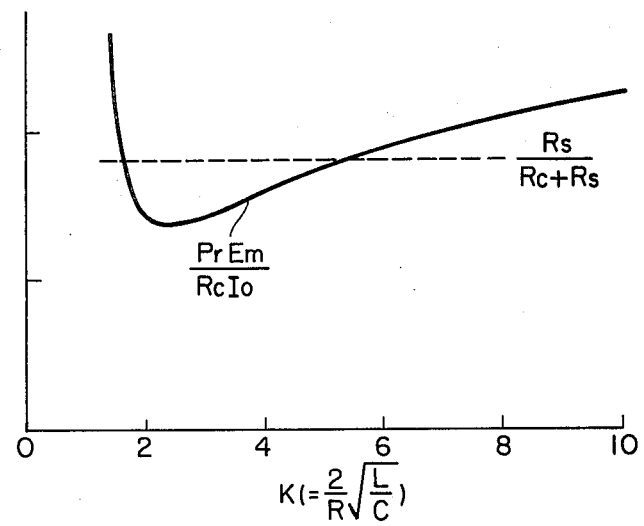
FIG. 4 is a chart showing the change of the constant of the circuit shown in FIG. 1.

FIG. 4 shows the characteristics of the term $P_r E_m / R_s I_0$ to the value k, which are obtained from the Equation (16). In comparison with the prior art system of the Equation (15), as indicated at a broken line, the performance can be improved more than that of the prior art, if the value k is selected within a predetermined range.

Figure 5:
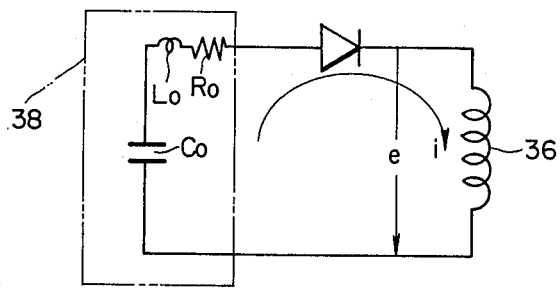
FIGS. 5 to 8 are electric circuit diagrams showing other embodiments of the present invention.

FIG. 5 shows another embodiment, in which a d.c. motor 38 forming part of the protecting device when in the quenching operation of a superconductive coil 36 is made to act as a steady energizing power source. Since, in this embodiment, the protecting device instantly operates when in the quenching operation of the superconductive coil 36, the Joule loss does not take place only in the superconductive coil during a time period (generally about 0.1 to 0.3 seconds) until the current switch is turned off so that the heat generated by the coil is reduced. Moreover, the d.c. power source for the steady energization and the current switch can be dispensed with.

Figure 6:
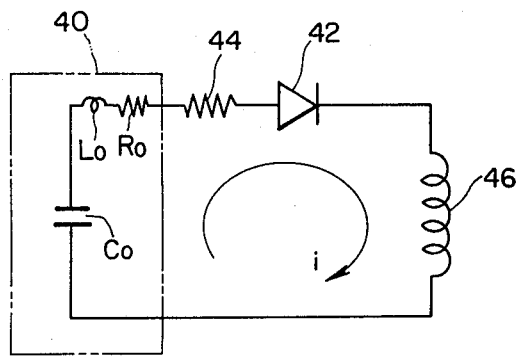

FIG. 6 shows a further embodiment, in which a resistor 44 is connected in series between a d.c. motor 40 and a unidirectional current gate device 42. According to this embodiment, there arises an effect that the ratio $R_s/R$ appearing in the Equation (12) is reduced to reduce the heat generation of a superconductive coil 46. Nevertheless, since the maximum terminal voltage appearing in the Equation (11) is raised, the embodiment can be used as regulating means for regulating both the maximum terminal voltage and the heat generated by the superconductive coil.

Figure 7:
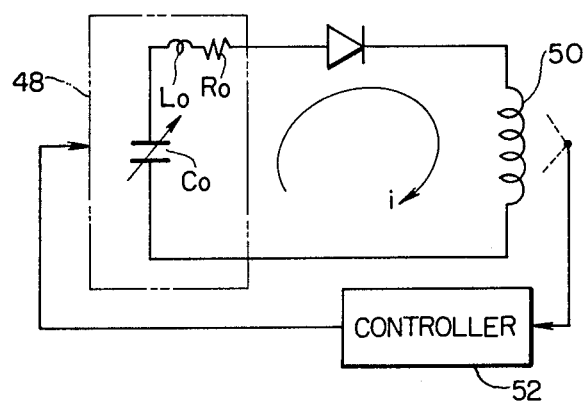

FIG. 7 shows a further embodiment, in which the equivalent capacitance $C_0$ of a d.c. motor 48 is made variable during the protecting operation. According to this embodiment, there can be attained an effect that the maximum terminal voltage of a superconductive coil 50, as expressed by the Equation (11), can be lowered. A controller 52 is provided to detect the terminal voltage of the superconductive coil 50, to adjust the field current of the d.c. motor 48 and to vary the equivalent capacitance $C_0$ which is expressed by the Equation (14).

Figure 8:
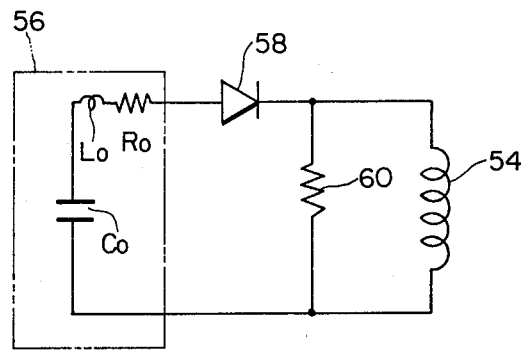

FIG. 8 shows a further embodiment, in which there are connected in parallal with a superconductive coil 54 both a series circuit composed of a d.c. motor 56 and a unidirectional current gate device 58, and a resistor 60. Since the magnetic energy of the superconductive coil is converted into both the Joule loss of the protecting resistor and the rotational energy of the d.c. motor, there can be attained according to that embodiment an effect that the heat generation of the coil is reduced. In FIG. 8, incidentally, one terminal of the protecting resistor 60 is connected with the cathode of the unidirectional current gate device 58 but may be connectd with the anode of the same.

As has been described hereinbefore, according to the present invention, the unidirectional current oscillations are generated, when in the quenching operation of the superconductive coil, by the equivalent capacitance of the d.c. motor as well as the inductance of that coil so that the magnetic energy of the superconductive coil can be partially converted into the rotational energy of the d.c. motor. As a result, the superconductive coil can have its heat generation reduced in the quenching operation so that it can be prevented from being thermally damaged. There arises another effect that the magnetic energy of the superconductive coil is stored as the rotational energy so that the energy can be utilized again.

We claim:

1. A superconductive coil system comprising: a superconductive coil adapted to be energized when in a normal running operation by an energizing power source; and a protecting device connected in parallel with said superconductive coil for absorbing a portion of the magnetic energy of said superconductive coil when in the quenching operation of said superconductive coil,
   wherein said protecting device includes: a unidirectional current gate device for allowing a coil current to flow only in the same direction as that of the normal running operation when in the quenching operation of said superconductive coil; and a d.c. motor connected in series with said unidirectional current gate device.

2. A superconductive coil system comprising: a superconductive coil; a power source for energizing said superconductive coil; a current switch connected between said superconductive coil and said power source; and a protecting device connected in parallel with said superconductive coil for absorbing a portion of the magnetic energy of said superconductive coil when in the quenching operation of said superconductive coil, wherein said protecting device includes: a unidirectional current gate device for allowing a coil current only in the same direction as that of the normal running operation when in the quenching operation of said superconductive coil; and a d.c. motor connecting in series with said unidirectional current gate device.

3. A superconductive coil system according to claim 1 or 2, wherein said d.c. motor is a unipolar motor.

4. A superconductive coil system according to claim 1 or 2, wherein said unidirectional current gate device is a diode.

5. A superconductive coil system according to claim 1 or 2, wherein said protecting device further includes a resistor connected in series with said unidirectional current gate device and said d.c. motor.

6. A superconductive coil system comprising:

a superconductive coil; and a protecting device connected in parallel with said superconductive coil and including a unidirectional current gate device and a d.c. motor connected in series with each other, the unidirectional current gate device of said protecting device having its conducting direction selected to allow a current to flow only in the same direction as that the normal running operation when in the quenching operation of said superconductive coil, said d.c. motor being adapted to energize said superconductive coil when in the normal running operation.

7. A superconductive coil system according to claim 6, further comprising a resistor connected in parallel with said superconductive coil.

* * * * *